US009407574B2

(12) United States Patent
Johnson et al.

(10) Patent No.: US 9,407,574 B2
(45) Date of Patent: Aug. 2, 2016

(54) USING SERDES LOOPBACKS FOR LOW LATENCY FUNCTIONAL MODES WITH FULL MONITORING CAPABILITY

(71) Applicant: ADVA Optical Networking SE, Meiningen (DE)

(72) Inventors: Marshall Johnson, Alpharetta, GA (US); David Dworkin, Alpharetta, GA (US); Robert Bishop, Suwanee, GA (US)

(73) Assignee: ADVA Optical Networking SE, Meiningen (DE)

( * ) Notice: Subject to any disclaimer, the term of this patent is extended or adjusted under 35 U.S.C. 154(b) by 0 days.

(21) Appl. No.: 14/254,950

(22) Filed: Apr. 17, 2014

(65) Prior Publication Data

US 2015/0304244 A1    Oct. 22, 2015

(51) Int. Cl.
| | |
|---|---|
| H04L 12/66 | (2006.01) |
| H04L 12/933 | (2013.01) |
| G06F 13/40 | (2006.01) |
| H04L 7/033 | (2006.01) |
| H04L 12/26 | (2006.01) |
| H04L 12/935 | (2013.01) |
| H04Q 11/00 | (2006.01) |

(52) U.S. Cl.
CPC ............ *H04L 49/10* (2013.01); *G06F 13/4022* (2013.01); *H04L 7/0331* (2013.01); *H04L 43/0847* (2013.01); *H04L 43/50* (2013.01); *H04L 49/3063* (2013.01); *H04Q 11/0071* (2013.01)

(58) Field of Classification Search
None
See application file for complete search history.

(56) References Cited

U.S. PATENT DOCUMENTS

| | | | | |
|---|---|---|---|---|
| 7,251,256 | B1* | 7/2007 | Barry .................... | H04J 3/0658 370/503 |
| 7,404,020 | B2* | 7/2008 | Dropps ................. | G06F 13/385 370/258 |
| 7,558,281 | B2* | 7/2009 | Dropps ................. | G06F 13/385 370/422 |
| 7,664,018 | B2* | 2/2010 | Warren ................. | H04L 12/433 370/230 |
| 7,688,106 | B1 | 3/2010 | Shumarayev et al. | |
| 2005/0129057 | A1* | 6/2005 | Chen ....................... | H04L 49/40 370/462 |
| 2007/0016835 | A1* | 1/2007 | Hronik ............. | G01R 31/31718 714/727 |

FOREIGN PATENT DOCUMENTS

| | | |
|---|---|---|
| CN | 101739241 A | 6/2010 |
| EP | 0 978 968 A2 | 2/2000 |
| WO | 2008095201 A1 | 8/2008 |

OTHER PUBLICATIONS

European International Search report corresponding to application No. 14184251.8, dated Dec. 14, 2016 (8 pages).

\* cited by examiner

*Primary Examiner* — Anh-Vu Ly
(74) *Attorney, Agent, or Firm* — Maginot, Moore & Beck, LLP

(57) ABSTRACT

An apparatus comprising high speed ports connected via an integrated high speed serial switch fabric and serializer/deserializer circuits to an internal processing logic, wherein the high speed serial switch fabric is adapted to switch a serial reception signal received by a high speed port to at least one of at least one other high speed port of the apparatus and to the serializer/deserializer circuit of the receiving high speed port.

17 Claims, 8 Drawing Sheets

USING SERDES LOOPBACKS FOR LOW LATENCY FUNCTIONAL MODES WITH FULL MONITORING CAPABILITY

BACKGROUND

The invention relates to a signal processing apparatus for point to point or point to multipoint communication between external units connected to the signal processing apparatus with very low latency.

An apparatus for point to point or point to multipoint communication can receive and transmit signals. For this purpose, a conventional apparatus comprises bidirectional ports which are used to connect external units to the apparatus. These external units can comprise client devices or network devices of a network. Each bidirectional port of such a conventional apparatus can comprise a transmission port to transmit signals to the respective unit and a reception port to receive a signal from the external unit. The bidirectional ports can be connected to serializer/deserializer circuits which are adapted to deserialize a serial signal received by the reception port of the bidirectional port from the connected external unit to generate an internal parallel signal and to serialize an internal parallel signal to generate a serial signal transmitted from the transmission port of the respective bidirectional port. The serializer/deserializer circuit performs a conversion of data between serial data and parallel data comprising interfaces in both directions. The deserialized data stream comprising an internal parallel signal can be applied to an internal signal processing block or functional block of the apparatus for data processing.

FIG. 2 shows a block diagram of a conventional apparatus comprising ports for connecting external units or external devices to the apparatus. The conventional apparatus illustrated in FIG. 2 comprises two bidirectional ports, wherein a first port is provided for connecting a network device of a network to the apparatus, and wherein the second port is provided for connecting a client device to the apparatus. Each bidirectional port comprises a reception port for receiving a serial reception signal rx from the connected device and a transmission port for transmitting a serial signal tx to the respective connected device. The reception port and the transmission port of each bidirectional port are connected to a serializer/deserializer circuit SerDes which transforms the received serial reception signal into an internal parallel signal provided to an internal functional block of the apparatus. Similarly the internal functional block can provide a parallel signal to the SerDes which transforms that internal parallel signal into a serial signal transmitted by the transmission port to the connected external unit or device. As shown in FIG. 2, the reception ports of both bidirectional ports comprise a clock and data recovery circuit CDR which receives the serial reception signal rx and which supplies the serializer/deserializer circuit SerDes with the recovered clock signal and with the recovered serial reception signal. Further, each bidirectional port comprises an internal loopback signal path lb which is adapted to loop in a test mode a signal received by its reception port back to the respective device via its transmission port as illustrated in FIG. 2. In the test mode, the signal transmitted by an external unit or device is looped directly back to the respective device for test purposes, i.e. data traffic originating from a sending source device is directly looped back to the sending source device.

In specific situations, it is desired to transport a signal from one external device connected to a first bidirectional port of the apparatus to another external device connected to another bidirectional port of the apparatus with a low latency. FIG. 3 shows a block diagram illustrating the operation of a conventional apparatus in a low latency operation mode. In FIG. 3, a network device is connected to a bidirectional network port of the apparatus and a client device is connected to a bidirectional client port of the apparatus. In the low latency mode of the apparatus, the output of the serializer/deserializer circuit within the bidirectional network port is directly connected to the corresponding serializer/deserializer circuit within the bidirectional client port as shown in FIG. 3. In the same way, the output of the serializer/deserializer circuit of the bidirectional client port is directly connected to the serializer/deserializer circuit within the bidirectional network port. The functional block does only tap the forwarded signal and does not increase the signal latency, however, in a conventional apparatus, as illustrated in FIG. 3, even in the low latency mode, the received signal still has to pass through the serializer/deserializer circuits of both bidirectional ports so that the signal latency of the forwarded signal cannot be lower than the signal latency caused by both serializer/deserializer circuits of the bidirectional ports. Accordingly, in the low latency mode of a conventional apparatus, internal functional blocks or internal logic circuits of the apparatus are bypassed, for instance by means of internal multiplexing circuits, however, a conversion of the signal between the serial and parallel domains has still to be performed incurring a significant signal latency within the apparatus.

Accordingly, it is an object of the present invention to provide an apparatus which allows to further reduce the signal latency in a low latency operation mode without increasing the complexity of the apparatus.

SUMMARY

The invention provides according to a first aspect a signal processing apparatus comprising high speed ports connected via an integrated high speed serial switch fabric and serializer/deserializer circuits to an internal processing logic, wherein the high speed serial switch fabric is adapted to switch a serial reception signal received by a high speed port to at least one other high speed port of the apparatus in addition to connections with a parallel domain of the high speed ports.

In a possible embodiment of the signal processing apparatus according to the first aspect of the present invention, the integrated high speed serial switch fabric provides a direct low signal latency port-to-port with a latency less than 10 nsecs in most devices today or less than several UI (Unit Intervals) in principle.

In a further possible embodiment of the signal processing apparatus according to the first aspect of the present invention, the serializer/deserializer circuit of the receiving high speed port is adapted to deserialize the serial reception signal to generate an internal parallel signal applied to the internal processing logic of the apparatus.

In a still further possible embodiment of the signal processing apparatus according to the first aspect of the present invention, the high speed serial switch fabric is adapted to switch the serial reception signal in response to an external control signal received by a control signal interface of the apparatus or in response to an internal control signal generated by the internal processing logic.

In a further possible embodiment of the signal processing apparatus according to the first aspect of the present invention, the signal processing apparatus is realized in an FPGA.

In a further alternative embodiment of the signal processing apparatus according to the first aspect of the present invention, the signal processing apparatus is realized in an ASIC.

In a still further possible embodiment of the signal processing apparatus according to the first aspect of the present invention, the signal processing apparatus is realized in an ASSP.

In a still further alternative embodiment of the signal processing apparatus according to the first aspect of the present invention, the signal processing apparatus is realized in a SOC or Hybrid crosspoint (XP) device.

In a still further possible embodiment of the signal processing apparatus according to the first aspect of the present invention, the high speed ports are bidirectional ports each comprising a reception port to receive a serial signal and a transmission port to transmit a serial signal.

In a further possible embodiment of the signal processing apparatus according to the first aspect of the present invention, each bidirectional high speed port comprises at least one internal loopback signal path provided to loop a signal received by its reception port directly back to its transmission port in response to an internal control signal repurposed for use as a low latency functional path.

In a still further possible embodiment of a signal processing apparatus according to the first aspect of the present invention, the integrated high speed serial switch fabric is used to tap and/or replicate and/or switch the serial reception signal received by the high speed port of the signal processing apparatus for use as a low latency functional path.

In a still further possible embodiment of the signal processing apparatus according to the first aspect of the present invention, the internal processing logic is adapted to process the internal parallel signals provided by the serializer/deserializer circuit for signal monitoring and/or signal evaluation and/or further processing and/or manipulation of the deserialized reception signal.

In a still further possible embodiment of the signal processing apparatus according to the first aspect of the present invention, if an error is detected by the internal processing logic during signal processing of the deserialized reception signal, an internal error detection signal is generated.

In a further possible embodiment of the signal processing apparatus according to the first aspect of the present invention, external units connected to the high speed ports of the signal processing apparatus comprise network devices and/or client devices.

In a still further possible embodiment of the signal processing apparatus according to the first aspect of the present invention, the reception port of each bidirectional high speed port is connected to a signal converter adapted to convert a received optical signal into an electrical signal and the transmission port of each bidirectional high speed port is connected to a signal converter adapted to convert an electrical signal into an optical signal.

In a still further possible embodiment of the signal processing apparatus according to the first aspect of the present invention, the reception port of each bidirectional high speed port comprises a clock and data recovery circuit receiving the serial reception signal and supplying the respective serializer/deserializer circuit of the bidirectional high speed port with a recovered clock signal and with a recovered serial reception signal.

In a still further possible embodiment of the signal processing apparatus according to the first aspect of the present invention, each bidirectional high speed port comprises a pre-CDR loopback signal path and a post-CDR loopback signal path either of which can be repurposed as a low latency functional path.

In a still further possible embodiment of the signal processing apparatus according to the first aspect of the present invention, the high speed serial switch fabric comprises one or more multiplexing units for a high speed port to select an internal logic signal provided by the internal processing logic or a reception signal received by another high speed port to be transmitted by the transmission port of the respective high speed port.

In a still further possible embodiment of the signal processing apparatus according to the first aspect of the present invention, the at least one internal loopback signal path within the bidirectional high speed port is connected to the multiplexing unit of the high speed serial switch fabric.

In a still further possible embodiment of the signal processing apparatus according to the first aspect of the present invention, the multiplexing unit of the bidirectional high speed port is controlled by selection bits stored in a control register of the high speed serial switch fabric.

In a still further possible embodiment of the signal processing apparatus according to the first aspect of the present invention, in response to the internal error detection signal generated by the internal processing logic, an arrow detection signal pattern is inserted by means of the multiplexing unit of the respective bidirectional high speed port and transmitted.

Accordingly, the invention provides a signal processing apparatus having at least two high speed ports each being provided for connecting an external unit to the signal processing apparatus, wherein in a low latency operation mode of the apparatus reception ports of a pair of high speed ports connecting the signal processing apparatus with a first external unit and with a second external unit are switched to provide a direct internal low latency communication link between both external units via loopback signal paths of the pair of high speed ports.

The invention accordingly provides a signal processing apparatus for point to point or point to multipoint communication between external units with a low latency, the signal processing apparatus having bidirectional high speed ports, each being provided for connecting an external unit to the signal processing apparatus, wherein each bidirectional high speed port of the signal processing apparatus comprises a transmission port and a reception port connected to a serializer/deserializer circuit which in a normal operation mode of the signal processing apparatus deserializes a serial reception signal received by the reception port of the high speed port from the respective external unit to generate an internal parallel signal applied to an internal processing logic of the signal processing apparatus and to serialize an internal parallel signal supplied from the internal processing logic of the signal processing apparatus to generate a serial signal transmitted from the transmission port of the bidirectional high speed port to the respective external unit, wherein each bidirectional high speed port of the signal processing apparatus further comprises at least one internal loopback signal path adapted to loop in a functional mode of the signal processing apparatus a signal received by its reception port directly back via its transmission port, wherein in a low latency operation mode of the signal processing apparatus the reception ports of a pair of high speed ports connecting the signal processing apparatus with a first external unit and with a second external unit are switched to provide a direct low latency communication link between both external units via the loopback signal paths of the pair of bidirectional high speed ports.

Accordingly, the invention provides a method for a point to point or point to multipoint communication with low latency, wherein serial reception signals received at high speed ports of a signal processing apparatus according to the first, second or third aspect of the present invention are switched or replicated by means of an integrated high speed serial switch fabric to provide a direct internal low latency communication link between external units connected to the high speed ports.

BRIEF DESCRIPTION OF FIGURES

In the following, possible embodiments of the signal processing apparatus and method according to the present invention are illustrated with reference to the enclosed figures in more detail.

DETAILED DESCRIPTION

Figure 1:
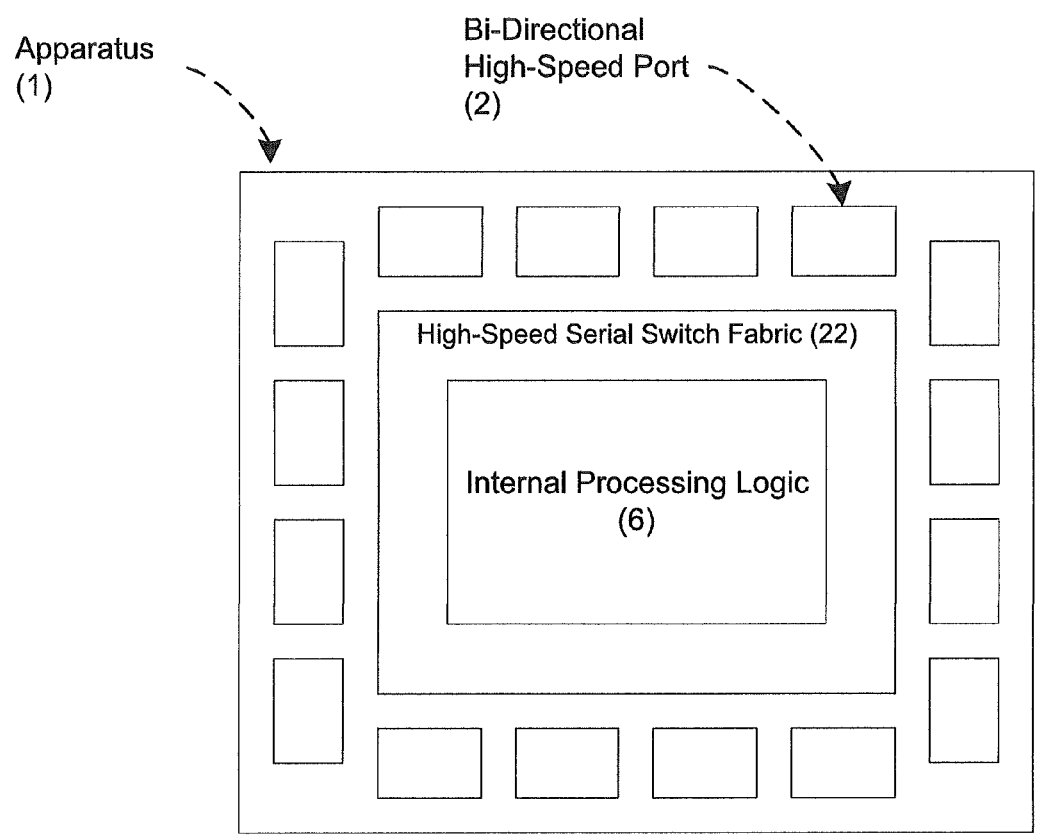
FIG. 1 shows a block diagram for illustrating a possible embodiment of a signal processing apparatus according to a first aspect of the present invention.
Figure 2:
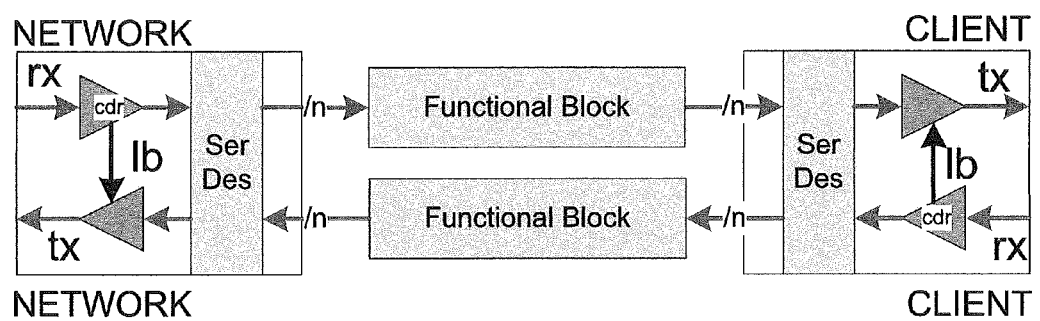
FIG. 2 shows a block diagram for illustrating a conventional apparatus in a normal operation mode.
Figure 4:
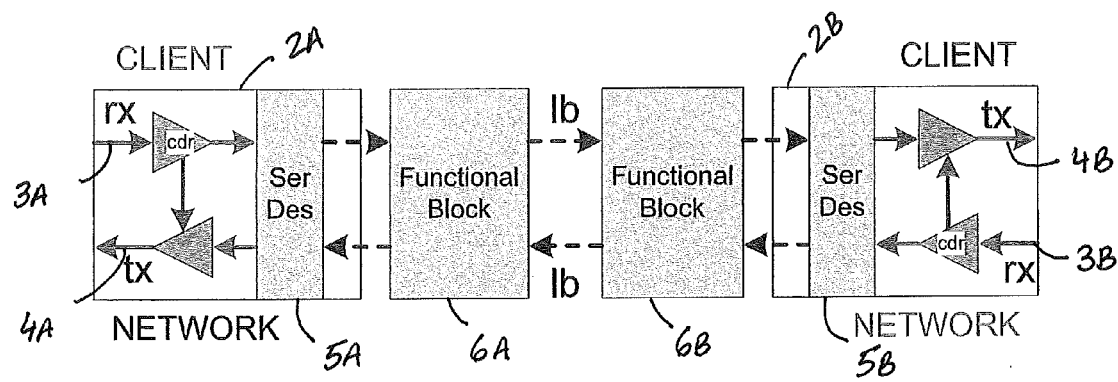
FIG. 4 shows a block diagram for illustrating the operation of an apparatus according to the first aspect of the present invention in a low latency operation mode.

As can be seen in FIG. 1 showing a possible embodiment of a signal processing apparatus 1 according to the first, second or third aspect of the present invention, the signal processing apparatus 1 comprises a number N of bidirectional high speed ports 2-$i$ adapted to connect external units or external devices to the signal processing apparatus 1. The number N of bidirectional high speed ports 2 of the signal processing apparatus 1 can vary. In a possible embodiment, the number N of bidirectional high speed ports 2 is at least two (N≥2). In a possible embodiment, the number N of high speed ports 2 of the signal processing apparatus 1 can be for instance N=48 or N=96. The number N of high speed ports 2 can even be higher than 96. Each high speed port 2 can comprise a reception port and a transmission port, wherein both ports are connected to a serializer/deserializer circuit as also illustrated in FIG. 4. FIG. 4 shows an embodiment with two high speed ports 2A, 2B. As shown in FIG. 1, the signal processing apparatus 1 comprises high speed ports 2 which are connected via an integrated high speed serial switch fabric 22 and serializer/deserializer circuits to an internal processing logic 6. The internal processing logic 6 can comprise internal processing blocks adapted to process signals applied to the internal processing logic 6. The internal processing blocks can form functional blocks 6A, 6B as illustrated in the embodiment of FIG. 4. As can be seen in FIG. 1, the internal processing logic 6 is embedded in the high speed serial switch fabric 22. The high speed serial switch fabric 22 is adapted to switch a serial reception signal received by a first high speed port 2$i$ to at least one other high speed port 2$j$ of the signal processing apparatus 1. Further, the high speed serial switch fabric 22 is adapted to switch the serial reception signal to connections of a parallel domain of the high speed ports. In a possible embodiment, the integrated high speed serial switch fabric 22 provides a direct low signal latency port-to-port with a latency less than 10 nsecs or less than several UI, wherein 1 UI=1/data rate of the received data signal. In a possible embodiment, the achieved minimum latency is 1 to 2 UI. The serializer/deserializer circuit of the receiving high speed port is adapted to deserialize the serial reception signal and to generate an internal parallel signal applied to the internal processing logic 6 of the signal processing apparatus 1.

In a possible embodiment, the high speed serial switch fabric 22 is adapted to switch the serial reception signal in response to an external control signal received by a control signal interface of the signal processing apparatus 1. The high speed serial switch fabric 22 can also be adapted to switch the serial reception signal in response to an internal control signal generated by the internal processing logic 6.

The signal processing apparatus 1 can be implemented as an FPGA, ASIC, ASSP, SOC or Hybrid crosspoint (XP) device. The high speed ports 2 of the signal processing apparatus 1 are bidirectional ports each comprising a reception port to receive a serial signal and a transmission port to transmit a serial signal. Further, each bidirectional high speed port 2 of the signal processing apparatus 1 comprises in a possible embodiment at least one internal loopback signal path provided to loop a signal received by its reception port directly back to its transmission port in response to an internal control signal. In this way, the internal loopback signal path is repurposed for use as a low latency functional path. The integrated high speed serial switch fabric 22 can be used to tap a serial reception signal received by a high speed port 2 of the signal processing apparatus 1. Further, the high speed switch fabric 22 can be used to replicate and/or switch the serial reception signal received by the high speed port 2 of the signal processing apparatus 1.

The internal processing logic 6 of the signal processing apparatus 1 is adapted to process the internal parallel signals provided by the serializer/deserializer circuits for signal monitoring of the deserialized reception signal. The internal processing logic 6 can also be adapted to perform a signal evaluation and/or any further processing or manipulation of the deserialized reception signals.

If an error is detected by the internal processing logic 6 of the signal processing apparatus 1 during signal processing of the deserialized reception signal, an internal error detection signal can be generated. External units are connected to the bidirectional high speed ports 2 of the signal processing apparatus 1. These external units can comprise network devices and/or client devices. In a possible embodiment, the reception port of each bidirectional high speed port 2 is connected to a signal converter adapted to convert a received optical signal into an electrical signal. Further, the transmission port of each bidirectional high speed port 2 can be connected to a signal converter adapted to convert an electrical signal into an optical signal. The optical signals can be transported via optical fibers.

The reception port of each bidirectional high speed ports 2 can comprise a clock and data recovery circuit receiving the serial reception signal and supplying the respective serializer/deserializer circuit of the bidirectional high speed port 2 with a recovered clock signal and with a recovered serial reception signal. In a possible embodiment, each bidirectional high speed port 2 comprises a pre-CDR loopback signal path and a post-CDR loopback signal path. Accordingly, the pre-CDR loopback signal path and the post-CDR loopback signal path can be used as a low latency functional path.

In a possible embodiment, the high speed serial fabric 22 can comprise one or more multiplexing units. Each high speed port 2. The high speed ports 2 can be selected in response to an internal logic signal provided by the internal processing logic 6. A reception signal received by a first high speed port 2 is in a now latency operation mode transmitted by the transmission port of a second high speed port 2. At least one internal loopback signal path within the bidirectional high speed port 2 can be connected to a multiplexing unit of a high speed serial switch fabric 22. The multiplexing unit of the bidirectional high speed port 2 can be controlled by selection bits stored in at least one control register of the high speed serial switch fabric 22. The high speed serial swift fabric 22 is in a possible embodiment pre-configurable or programmable.

In a possible embodiment, in response to an internal error detection signal generated by the internal processing logic 6, an error detection signal pattern is inserted by means of the multiplexing unit of the respective bidirectional high speed port 2 and transmitted to a target device. As shown in FIG. 1, the signal processing apparatus 1 does comprise at least two high speed ports 2, wherein each high speed port 2 is provided for connecting an external unit or external device to the signal processing apparatus 1. In a low latency operation mode of the signal processing apparatus 1, the reception ports of a pair of high speed ports 2 connecting the apparatus 1 with a first external unit and with a second external unit are switched or swapped to provide a direct internal low latency communication link between both external units via loopback signal paths of the pair of high speed ports 2.

The signal processing apparatus 1 as illustrated in FIG. 1 can be used for point to point or for point to multipoint communication between external units with very low signal latency. The external units are connected to the apparatus 1 via corresponding bidirectional high speed ports 2. Each bidirectional high speed port 2 of the signal processing apparatus 1 can comprise a transmission port and a reception port which are connected to a serializer/deserializer circuit. The serializer/deserializer circuit is adapted to deserialize in a normal operation mode of the signal processing apparatus 1 a serial reception signal received by the reception port of the high speed ports 2 from the respective external unit. In this way, an internal parallel signal is generated and applied to the internal processing logic 6 of the signal processing apparatus 1. Further, in the normal operation mode of the signal processing apparatus 1, the serializer/deserializer circuit serializes an internal parallel signal supplied from the internal processing logic 6 to generate a serial signal transmitted from the transmission port of the bidirectional high speed port 2 to the respective external unit.

Each bidirectional high speed port 2 of the apparatus 1 comprises at least one internal loopback signal path which is adapted to loop in a functional mode of the apparatus 1 a signal received by its reception port directly back via its transmission port. Further, in a low latency operation mode of the apparatus 1, the reception ports of a pair of high speed ports 2 connecting the apparatus 1 with a first and second external unit are switched to provide a direct low latency communication link between both external units via the loopback signal paths of the pair of bidirectional high speed ports 2.

As can be seen in FIG. 4, a signal processing apparatus 1 according to the first aspect of the present invention can comprise high speed ports 2A, 2B adapted to connect external units or devices to the apparatus 1. In a possible embodiment, the apparatus 1 comprises at least two high speed ports 2A, 2B which are used to connect external devices to the apparatus 1. The apparatus 1 can for instance be used to provide a connection between a client device and a network device. In the embodiment shown in FIG. 4, the apparatus 1 comprises a first high speed bidirectional port 2A and a second high speed bidirectional port 2B. In a normal operation mode of the apparatus 1, the first high speed port 2A is connected to a first external unit or external device and the second high speed port 2B is connected to another external unit or external device. In the specific exemplary embodiment shown in FIG. 4, in the normal operation mode of the apparatus 1, a network device is connected to the first high speed port 2A and a client device is connected to the second high speed port 2B.

In FIG. 4 the test mode serial loopback path is used as a functional path between network and client. The test mode is provided in the parallel domain. In the test mode a parallel loopback mode latency generally does not matter.

The low latency serial path is between network and client instead of network or client loopback. The previous test mode loopback path is now implemented in the parallel domain. The implementation of the loopback test mode in the parallel domain is adequate as loopback is not typically concerned with latency.

Each high speed port 2A, 2B comprises several entities, as illustrated in FIG. 4. Each high speed port 2A, 2B is a bidirectional port and comprising a reception port and a transmission port, wherein both ports are connected to a serializer/deserializer circuit SerDes. As illustrated in FIG. 4, the first bidirectional high speed port 2A comprises a reception port 3A, a transmission port 4A and a serializer/deserializer circuit 5A. The second bidirectional high speed port 2B comprises a reception port 3B, a transmission port 4B and a serializer/deserializer circuit 5B. The serializer/deserializer circuits 5A, 5B of the high speed ports 2A, 2B are connected to internal functional signal processing blocks 6A, 6B adapted to process deserialized internal parallel signals provided by the respective serializer/deserializer circuits 5A, 5B. The internal signal processing blocks 6A, 6B form part of the internal logic 6 or other signal processing means. The internal signal processing blocks or functional blocks 6A, 6B can perform a signal processing function, wherein deserialized parallel signals received from a serializer/deserializer circuit are processed and the processing result is applied to another serializer/deserializer circuit of a high speed port 2 which deserializes the processed result data.

The signal processing apparatus 1 according to the first aspect of the present invention can be switched between different operation modes. In a normal operation mode, a reception signal received from a first external unit or device connected to a first high speed port is applied as a serial signal to a reception port of the first high speed port, wherein the reception port supplies the received serial data signal to the deserializer circuit of the respective high speed port 2, where it is deserialized and applied as a parallel data signal to a corresponding internal signal processing block 6, adapted to process the received data according to a predetermined processing function. The deserialized signal can be processed by one or several functional blocks 6A, 6B within the signal processing apparatus 1. After having been processed, the results provided by the functional blocks 6A, 6B are supplied to the serializer/deserializer circuit of the high speed port 2 to which an external target device is connected. After deserialization, the processed result data is output by the transmission port of the bidirectional high speed port 2 of the target device as a serial output data stream. In the normal operation mode of the apparatus 1 according to the present invention, the serial data stream originating from a source device is applied via a signal line to the reception port 3 of the high speed port 2 of the source device, deserialized and then processed by internal functional processing blocks 6A, 6B. The processed result data is deserialized and transmitted from the transmission port 4 of the high speed port 2 of the target device via a signal line to the target device. The communication between the source device and the target device can be performed bidirectional, i.e. the target device can also act as a source device and vice versa. In the normal operation mode, the received and deserialized signals are processed internally by at least one internal functional processing block 6A, 6B, wherein a signal delay is caused by the data processing within the internal signal processing blocks 6A, 6B of the apparatus 1. A further signal delay is caused by the deserialization of the input signal and the serialization of the output signal.

In a possible embodiment of the signal processing apparatus 1 according to the first aspect of the present invention, the apparatus 1 is switchable between a normal operation mode, a test mode and a low latency operation mode.

In the test mode, a test signal received from an external sending device connected to a high speed port 2-*i* of the apparatus 1 is directly looped back by means of an internal loopback signal path of the high speed port 2-*i* to which the sending device is connected and forwarded directly back to the sending device for test purposes. In the test operation mode, the signal received by a reception port 3 of a high speed port 2-*i* is directly forwarded to the corresponding transmission port 4 of the same high speed port 2.

In the low latency operation mode of the apparatus 1, the reception ports 3 of a pair of high speed ports 2*i*, 2*j* connecting the signal processing apparatus 1 with a first external unit and with a second external unit are switched to provide a very low latency communication link between both external units via the internal loopback signal paths provided within the two high speed ports 2*i*, 2*j*, as also illustrated in FIG. 4. In the specific exemplary embodiment shown in FIG. 4, the first high speed port 2A is a high speed port connecting a network device to the apparatus 1 and the high speed port 2B is a high speed port connecting a client device to the apparatus 1. Accordingly, in the normal operation mode the network device of a network connected to the network device high speed port 2A transmits serial data to the reception port 3A of the network device high speed port 2A and receives serial data from the transmission port 4A of the network device high speed port 2A. In the same manner, a client device connected to the client device high speed port 2B transmits serial data to the reception port 3B of the client device high speed port 2B and receives serial data from the transmission port 4B of the client device high speed port 2B.

Figure 3:
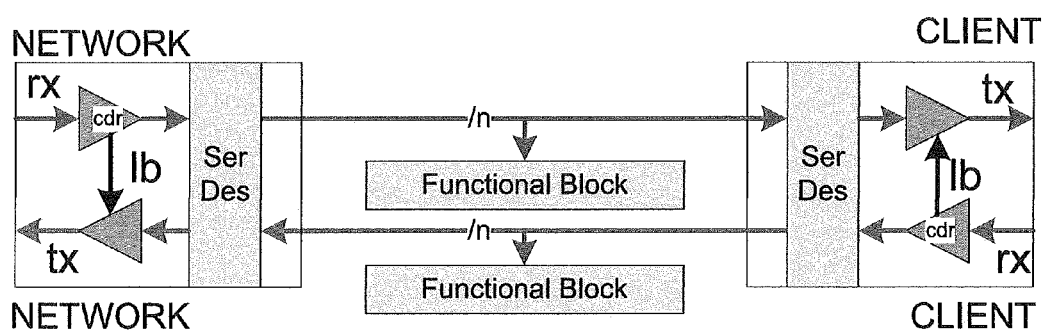
FIG. 3 shows a block diagram of a conventional apparatus operating in a low latency operation mode.

In a possible embodiment, the signal processing apparatus 1 according to the first aspect of the present invention is switched from a normal operation mode to a low latency operation mode in response to an operation mode control signal. In the low latency operation mode, the reception ports 3A, 3B of a pair of high speed ports 2A, 2B, where a first external unit and a second external unit are connected to the apparatus 1 are switched, i.e. swapped to provide a direct low latency communication link between both external units. In the specific exemplary embodiment of FIG. 3, in the low latency operation mode of the apparatus 1, the reception port 3A of the first high speed port 2A being connected in the normal operation mode of the apparatus 1 to the external network device is switched to receive a serial reception signal from the external client device and at the same time the reception port 3B of the second high speed port 2B being connected in the normal operation mode to the client device is switched to receive a serial reception signal from the external network device.

In the low latency operation mode of the signal processing apparatus 1, a serial reception signal received by the switched reception port 3A of the first high speed port 2A from the external client device is transported via the internal loopback signal path of the first high speed port 2A to the transmission port 4A of the first high speed port 2A and forwarded directly with a low signal latency to the external network device. In the same manner, in the low latency operation mode of the apparatus 1, a serial reception signal received by the switched reception port 3B of the second high speed port 2B from the external network device is transported via the internal loopback signal path of the second high speed port 2B to the transmission port 4B of the second high speed port 2B and forwarded directly with a low signal latency to the external client device. As can be seen in FIG. 4, the external connections for the external network device and the external client device are swapped at the reception ports 3A, 3B to provide a direct low latency communication data link between the network device and the client device. This low latency communication data link is a bidirectional link allowing both external devices, i.e. the network device and the client device to communicate with each other with a very low signal latency. The bidirectional low latency communication data link between the external units or devices uses the internal loopback signal paths of the high speed ports 2A, 2B which can also be used for the test mode operation mode of the apparatus 1. The bidirectional communication data link comprises two signal paths connecting the external client device as a signal source to a network device as a signal sink and connecting at the same time the network device as a signal source to the client device as a signal sink. Both signal paths of the low latency communication data link do not pass through the serializer/deserializer circuits 5A, 5B of the high speed ports 2A, 2B so that the signal latency of the transported signal is minimized.

In a possible preferred embodiment of the signal processing apparatus 1 according to the first aspect of the present invention, in the low latency operation mode of the apparatus 1, the serial reception signals received by the switched reception ports of both high speed ports 2A, 2B and transported via the internal loopback signal paths are simultaneously also supplied to the serializer/deserializer circuits 5A, 5B of the high speed ports 2A, 2B, where they are deserialized to generate internal parallel signals which are processed by internal processing blocks 6A, 6B of the apparatus 1 for signal monitoring and/or signal evaluation of the received and directly forwarded serial reception signals. Accordingly, in this embodiment the received signal path is still fully enabled allowing the received data to flow into the internal logic 6 or processing blocks 6A, 6B of the apparatus 1, where they are processed. In this embodiment, the internal signal processing blocks or functional blocks 6A, 6B connected to the serializer/deserializer circuits 5A, 5B can monitor the directly forwarded serial data stream without adding any signal latency. In a possible embodiment, the internal functional blocks 6A, 6B can evaluate the deserialized reception signal which at the same time is forwarded directly with a minimal signal delay to provide statistics of the signal and/or to detect error conditions from the evaluated signal. The monitored data signal is simultaneously sent from the reception port 3 of the high speed port 2 to the transmission port 4 via the internal serial loopback path and can be sent immediately out of the apparatus 1 incurring a minimum signal latency. In a possible embodiment, the achieved minimum latency is 1 to 2 UI, wherein 1 UI=1/data rate of the received data signal. Accordingly, the apparatus 1 according to the first aspect of the present invention provides a very low signal latency but maintains at the same time a full signal monitoring capability.

In a possible embodiment, if by evaluating the received data an error is detected by an internal processing block 6A, 6B during signal processing of the deserialized reception signal, an internal error detection signal can be generated. In a possible embodiment, in response to the error detection signal generated by the internal processing block 6A, 6B, an error detection signal pattern can be generated and inserted by means of a crosspoint switch element of the respective high speed port 2, wherein the inserted error detection signal pattern can be transmitted by the transmission port 4 of the high speed port 2 to an external target device to indicate the detected signal error. In a possible embodiment, the inserted error detection signal pattern is a predetermined error signal detection pattern recognizable by the target device.

Figure 5:
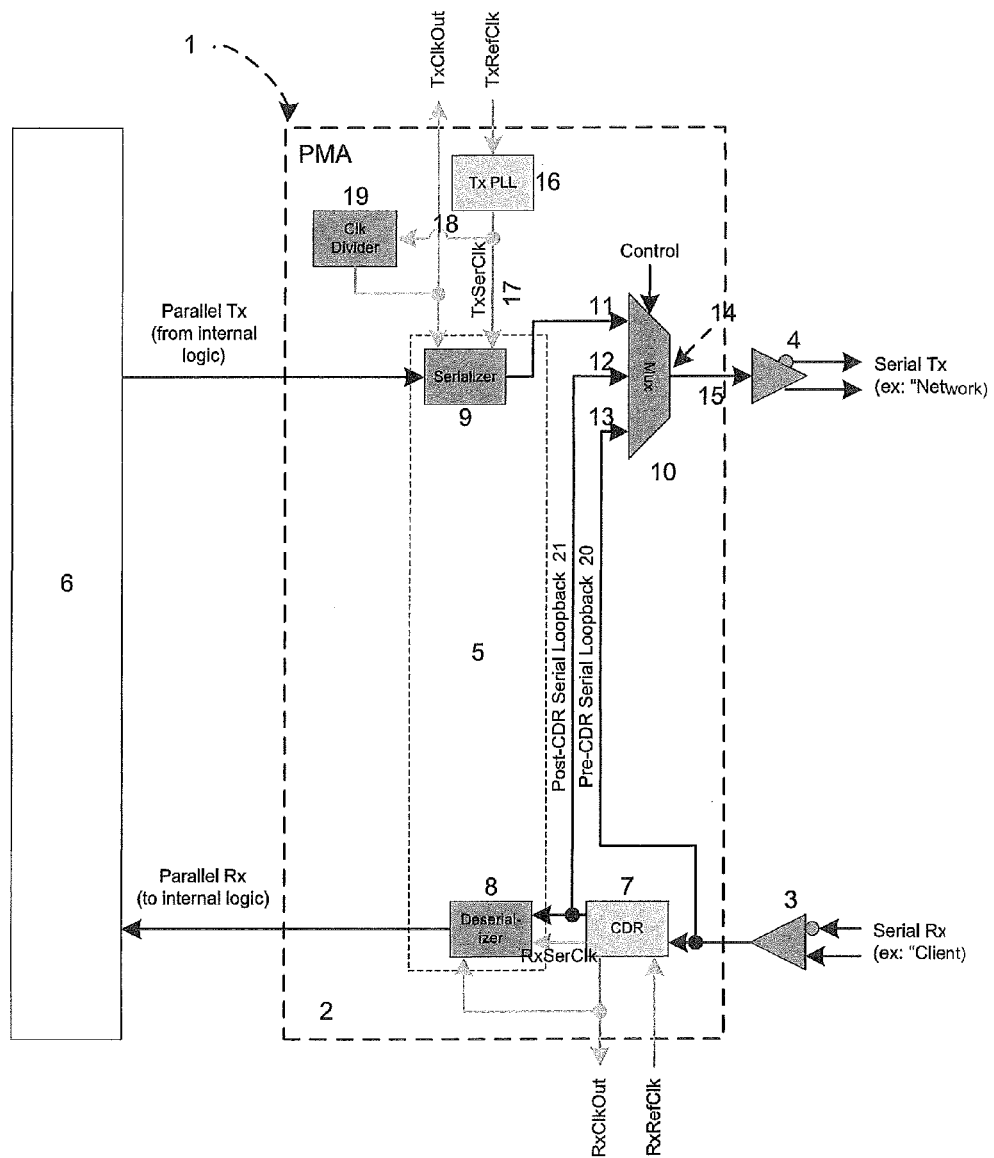
FIG. 5 shows a circuit diagram for illustrating a possible embodiment of an apparatus according to the first aspect of the present invention.

FIG. 5 shows a circuit diagram for illustrating a possible embodiment of the signal processing apparatus 1 according to the first aspect of the present invention. FIG. 5 illustrates a bidirectional high speed port 2 of a physical medium attachment layer PMA having a reception port 3 and a transmission port 4. The reception port 3 is adapted to receive a serial reception data stream from a signal source, in particular an external unit or device connected or attached to the apparatus 1. The transmission port 4 of the bidirectional high speed port 2 is adapted to transmit a serial data stream to a data target device or a data sink, in particular an external unit or device connected or attached to the apparatus 1. In a possible embodiment, the reception port 3 is switchable between two inputs depending on the operation mode of the apparatus 1. Also, the transmission port 4 of the bidirectional high speed port 2 is switchable to output the serial data stream to two different data sinks or data target devices.

As can be seen in FIG. 5, the reception port 3 can be switched between two serial data inputs. The transmission port 4 can be switched between two serial data outputs. The switching of the reception port 3 and the transmission 4 of the bidirectional high speed port 2 can be performed in a possible embodiment in response to an internal control signal provided by a control unit integrated in the apparatus 1 and/or by selection control bits stored in a programmable control register of the apparatus 1. In a possible embodiment of the apparatus 1 according to the first aspect of the present invention, the output signals output by the switchable transmission port 4 are supplied to a signal converter which is adapted to convert the output electrical signals received from the transmission port 4 into corresponding optical signals which are transported via optical fibers to an external unit or device connected to the apparatus 1. At the input side of the reception port 3, a further signal converter can be provided which is adapted to convert a received optical signal received from an external unit or device into an electrical signal applied to the reception port 3 of the high speed port 2. In this embodiment, a conversion between an external optical signal domain and an internal electrical domain is performed by means of signal conversion units provided at the reception port 3 and the transmission port 4. This embodiment provides optical links between the external units or devices and the high speed ports 2-i of the apparatus 1, wherein the data processing within the apparatus 1 is performed in the electrical signal domain.

As illustrated in FIG. 5, the reception port 3 of the high speed port 2 comprises a clock and data recovery unit 7 receiving the serial reception signal from the reception port 3. The clock and data recovery unit 7 is adapted to recover a clock signal RxSerClk and the received serial reception signal received by the reception port 3. The recovered clock and data signal is applied by the clock and data recovery unit 7 to a deserializing unit 8 within the serializer/deserializer circuit 5 forming a serial to parallel converter or SIPO unit (SIPO: Serial Input Parallel Output). The deserializer unit 8 can comprise a clock input to receive the recovered clock signal from the clock and data recovery unit 7 and a serial data input to receive the recovered data signal and a set of data output lines. In a possible embodiment, the serializer/deserializer circuit 5 can also comprise encoding or decoding blocks. The deserializing unit 8 deserializes the serial reception signal received from the clock and data recovery unit 7 to generate internal parallel data signals applied to the internal signal processing block 6, as illustrated in FIG. 5.

The serializer/deserializer circuit 5 further comprises a serializer unit 9 adapted to deserialize internal parallel data signals applied from the internal signal processing block 6 to generate a serial signal which is then supplied to an internal crossbar switch or multiplexing entity 10 of the connection terminal 2 as illustrated in FIG. 5. The switching unit 10 forms a multiplexing entity which can be controlled by an internal control signal depending on an operation mode of the apparatus 1. In the exemplary specific embodiment shown in FIG. 5, the switching entity or crossbar switch 10 does comprise three signal inputs 11, 12, 13 and an output 14 connected via signal line 15 to the transmission port 4. In the exemplary embodiment of FIG. 5, the deserializer unit 9 is clocked by a clock signal provided by an integrated phase-locked loop, PLL, circuit 16. The phase-locked loop circuit 16 supplies in response to a reference clock signal an internal clock signal via clock signal lines 17, 18 to the serializer unit 9 and to a clock signal dividing unit 19 which is adapted to divide the clock rate of the clock signal provided by the PLL circuit 16. The clock signal with the reduced clock rate is supplied by the clock dividing unit 19 to the serializer unit 9.

As shown in FIG. 5, the high speed port 2 comprises in the exemplary embodiment a pre-CDR loopback signal path 20 and a post-CDR signal path 21. The pre-CDR loopback signal path 20 connects the input of the clock and data recovery circuit 7 with input 13 of the multiplexing unit 10. The post-CDR signal path 21 connects the data output of the clock and data recovery circuit 7 to the input 12 of the multiplexing unit 10 as illustrated in FIG. 5. The multiplexing entity 10 which can form part of an integrated crossbar switch array 22 is in the shown specific embodiment switchable between its three inputs 11, 12, 13. In the normal operation mode of the apparatus 1, the multiplexing unit 10 is switched to the first input 11 to receive the processed data stream serialized by the serializer unit 9. In the low latency operation mode, the multiplexing unit 10 is either switched to the second input 12 or the third input 13. In a pre-CDR loopback operation mode using signal path 20, the lowest possible signal latency is caused, however, no electrical signal improvements to the outgoing signal can be performed. In the post-CDR loopback low latency operation mode using signal path 21, a small amount of signal latency is caused by the clock and data recovery unit 7 but it is possible to perform electrical signal improvements to the outgoing signal, for instance by signal equalization and pre-emphasis.

In a possible embodiment of the signal processing apparatus 1, each high speed port 2 of the apparatus 1 comprises a pre-CDR serial loopback path 20 and a post-CDR serial loopback path 21, as illustrated in FIG. 5. In other possible embodiments, only a pre-CDR serial loopback path 20 is provided in the high speed port 2. In a further possible embodiment, each high speed port 2 does only comprise a post-CDR serial loopback path 21.

In a still further possible embodiment, the high speed port 2 of the signal processing apparatus 1 comprises both a pre-CDR serial loopback path 20 and a post-CDR serial loopback path 21, wherein in the low latency operation mode a control circuit within the apparatus 1 decides which serial loopback path is to be used for low latency signal transmission depending on the signal quality of the received serial signal. In this embodiment, a signal quality evaluation entity can analyze the incoming analog signal, i.e. the analog optical signal or the converted electrical signal to monitor the signal quality of the received signal. If the signal quality of the received signal is high, no data recovery or signal improvements are necessary and the multiplexing unit 10 is automatically switched to input 13 using the pre-CDR serial loopback path 20 with the lowest possible signal latency. Otherwise, if the signal quality of the received analog signal is comparatively low requiring a data recovery by the clock and data recovery unit 7, the multiplexing unit 10 is automatically switched to the second input 12 using the post-CDR serial loopback path 21 introducing a low signal latency but performing signal improvements by equalization and pre-emphasis. In a further possible embodiment, the use of the post-CDR serial loopback signal path 21 or the pre-CDR serial loopback path 20 in the low latency operation mode of the apparatus 1 can be preconfigured by programming a programmable control register controlling the multiplexing unit 10 by means of selection control bits. Accordingly, in this embodiment, the signal latency provided in the low latency operation mode of the apparatus 1 is configurable and can be adapted to the environment of the apparatus 1, i.e. network devices or client devices connected to the high speed ports 2.

Figure 6:
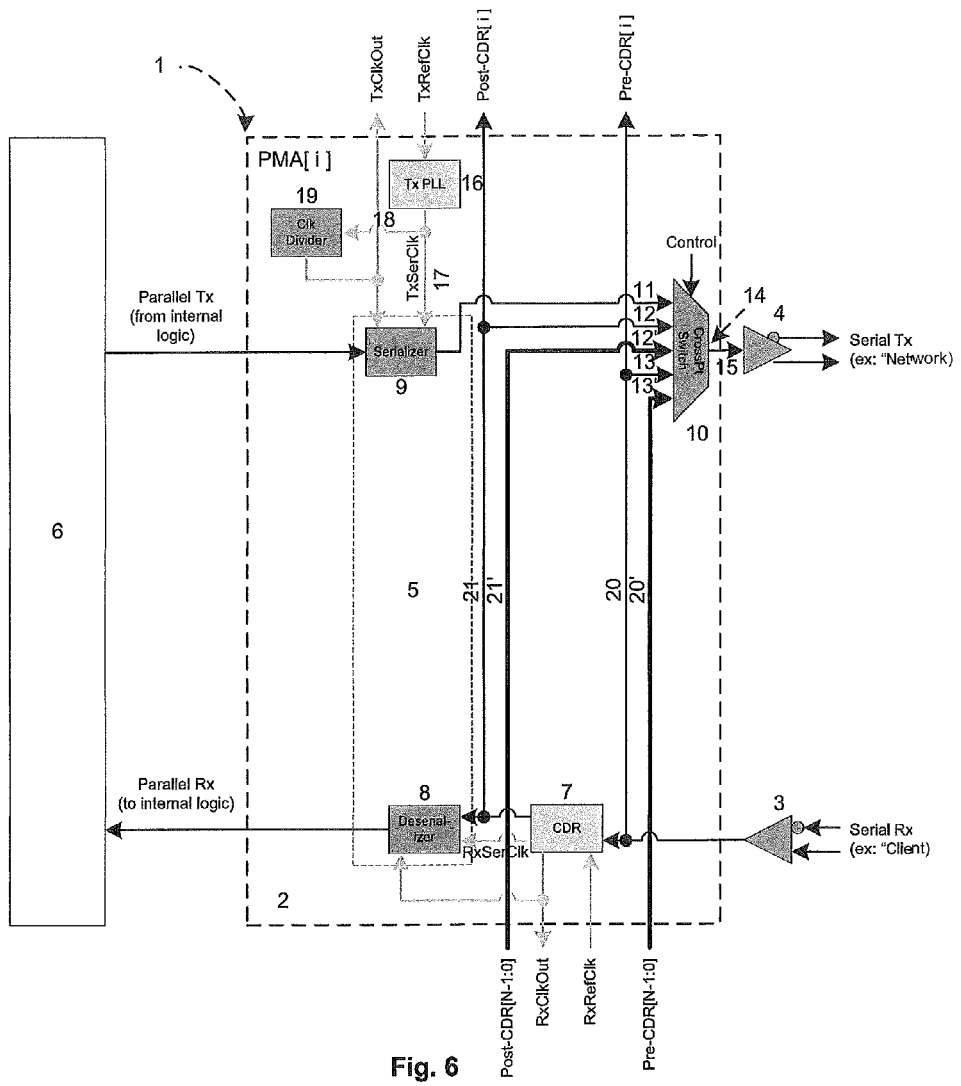
FIG. 6 shows a circuit diagram for illustrating a possible embodiment of an apparatus according to the first aspect of the present invention.

FIG. 6 shows a circuit diagram for illustrating a further possible embodiment of the signal processing apparatus 1 according to the first aspect of the present invention. In the shown exemplary embodiment, the multiplexing entity 10 is formed by a crossbar switch entity with several inputs. In the shown embodiment, the crossbar switch 10 comprises a first input 11 connected to the serializer unit 9, a second input 12 connected to the output of the clock and data recovery unit 7 of the high speed port 2 via the post-CDR loopback signal path 21, a third input 13 connected to the input of the clock data recovery unit 7 via the pre-CDR loopback signal path 20. The crossbar switch 10 comprises further inputs 12' and 13' to receive post-CDR signals and pre-CDR signals from other high speed ports 2 within the same apparatus 1. Each high speed port 2 can comprise an integrated crossbar switch 10, as illustrated in the embodiment of FIG. 6.

Figure 7A:
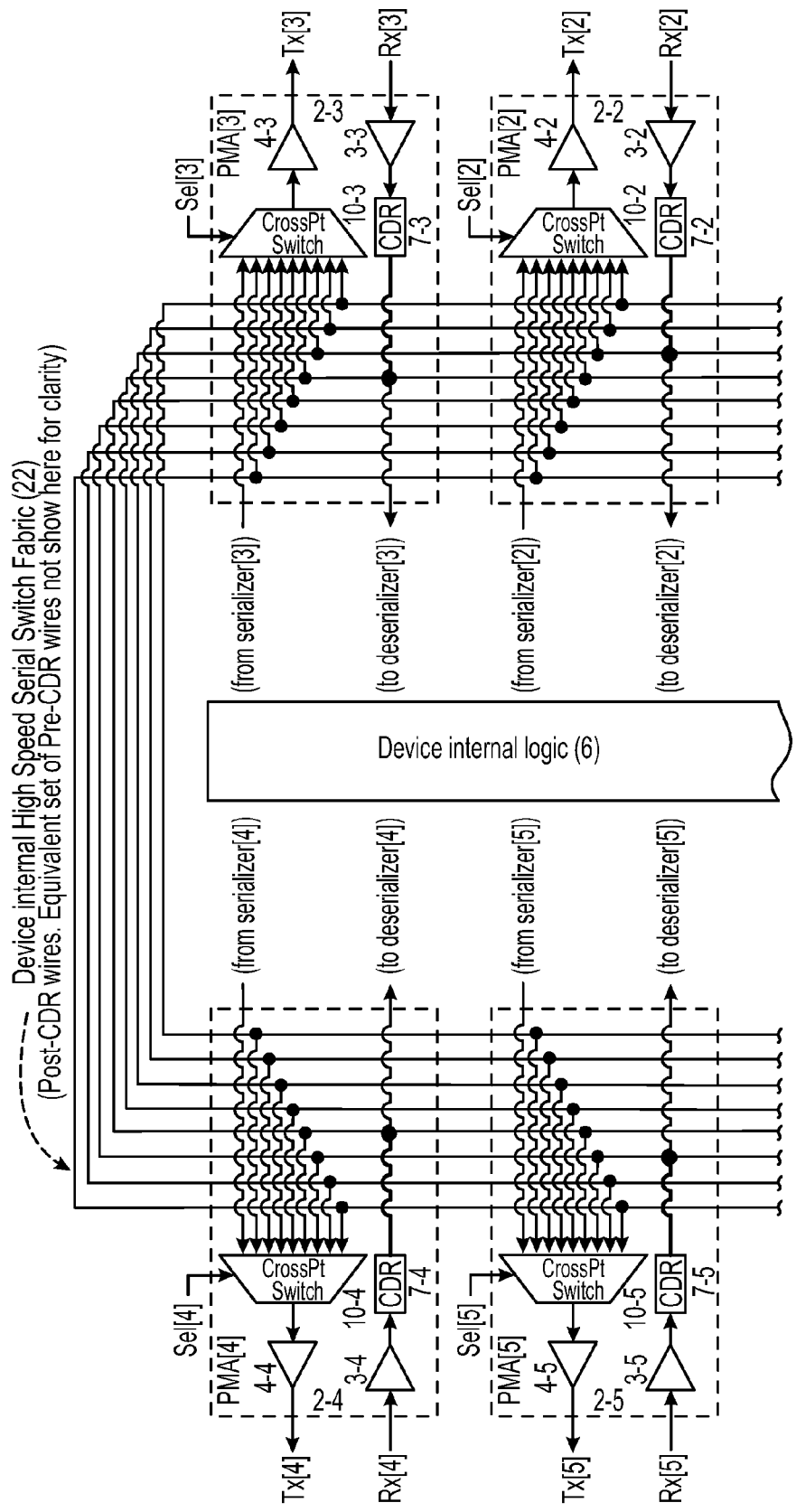
FIGS. 7A, 7B combine to show a circuit diagram for illustrating a further possible embodiment of an apparatus according to the first aspect of the present invention.
Figure 7B:
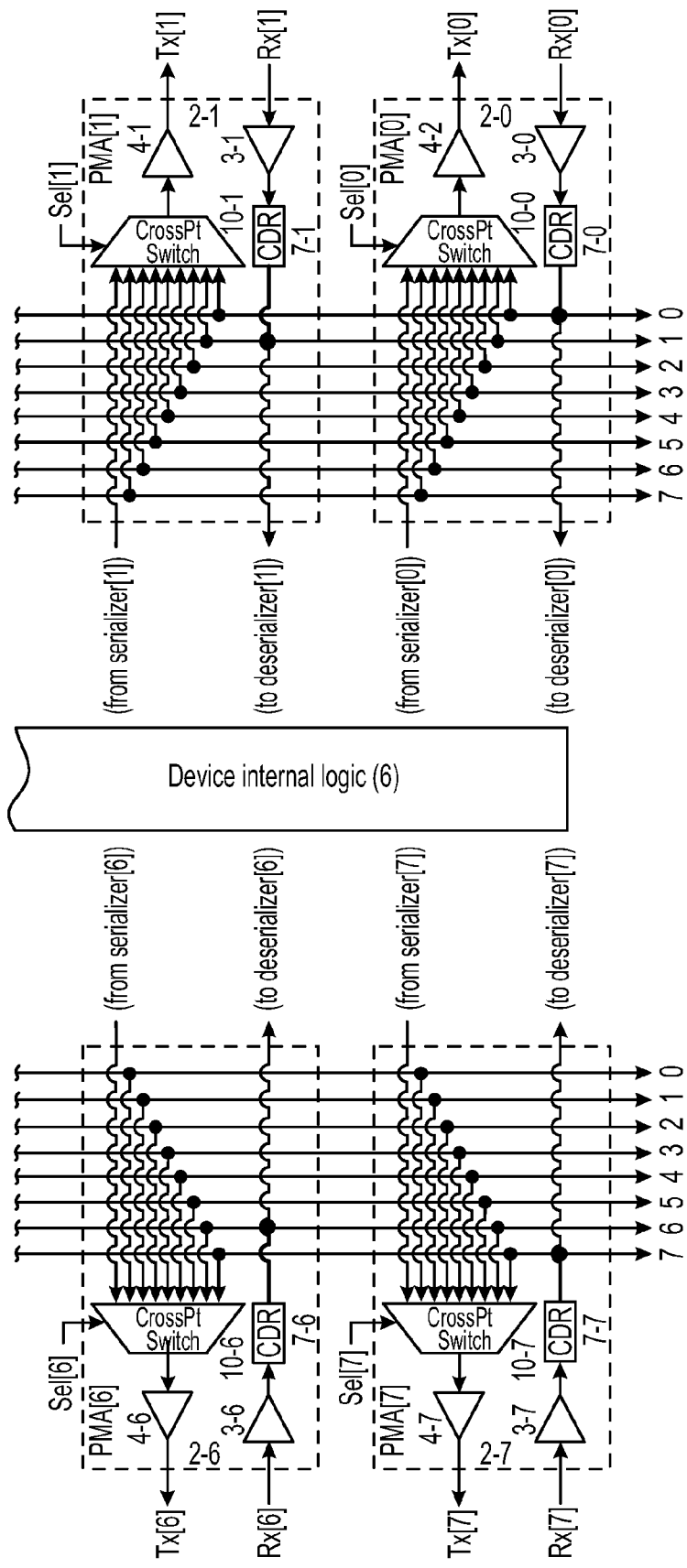

The crossbar switches 10 of the different high speed ports 2 can form in a possible embodiment a crossbar switch array 22 integrated in the signal processing apparatus 1, as illustrated in FIGS. 7A, 7B. In the embodiment shown in FIGS. 7A, 7B, the signal processing apparatus 1 comprises eight high speed ports 2-0 to 2-7 each having a crossbar switch 10-$i$ forming a 8×8 crosspoint switch array. The crosspoint switch array forms a high speed serial switch fabric 22 around the internal processing logic 6. The 8×8 crosspoint switch array 22 comprises in the shown embodiment device internal high speed post-CDR wires connecting the crossbar switch 10-$i$ of each high speed port 2-$i$ to any other crossbar switch 10-$j$ of any other high speed port 2-$j$ of the signal processing apparatus 1. In FIGS. 7A, 7B, only the post-CDR connection loop signal branches 21 are illustrated for clarity. In a further possible embodiment, the crossbar switches 10-$i$ of the different high speed ports 2 are also connected by device internal high speed pre-CDR wires 20.

The multiplexing selection signals SEL(n) illustrated in FIGS. 7A, 7B originate in a possible embodiment from device control registers which can be programmed to control different dataflow scenarios. These dataflow scenarios can comprise low latency dataflow scenarios, in particular a client-line dataflow scenario, where a client device is connected to a network device via the signal processing apparatus 1 according to the first aspect of the present invention. Further dataflow scenarios comprise a switching low latency dataflow, a multicast low latency dataflow and a broadcast low latency dataflow. The signal processing apparatus 1 can provide a point to point or a point to multipoint communication link with a very low signal latency.

The signal processing apparatus 1 offers a very low signal latency in the electrical domain, while still allowing for a maximum monitoring and consequent action capabilities of the data traffic. The signal processing apparatus 1 according to the first aspect of the present invention further provides a potential low latency signal replication comprising signal multicast or signal broadcast and/or signal switching capabilities. The apparatus 1 can comprise an extremely low signal latency, for instance for transparent OEO cards. The signal processing apparatus 1 according to the first aspect of the present invention can provide a configurable signal latency based on what is theoretically possible while enabling various consequent actions, performance metrics, signal replication or signal switching. The signal processing apparatus 1 in the embodiment as shown in FIGS. 7A, 7B can provide high speed serial rooting channels between multiple high speed ports 2 providing an improved multiplexing capability. In the embodiment of FIGS. 7A, 7B, the apparatus 1 comprises an integrated 8×8 crosspoint switch array forming a high speed serial switch fabric 22. The integrated high speed switch fabric 22 provides a direct low signal latency port-to-port with a latency less than 10 nsecs or less than several UI. The size of the crosspoint switch array can vary depending on the signal processing apparatus 1 and the number of high speed ports 2. In general, the signal processing apparatus 1 can comprise an N×N crosspoint switch array 22, wherein N is the number of high speed ports 2-$i$ of the signal processing apparatus 1. The number N of high speed ports 2-$i$ is at least two N≥2. In possible embodiments, the number N of high speed ports 2-$i$ can be N=48, N=96 and even higher. The crosspoint switch array 22 can be implemented in a possible embodiment within an FPGA or by an ASIC circuit. The high speed switch fabric 22 can be programmable. In a possible embodiment, the signal processing apparatus 1 provides an extremely low latency functional path between a client device and a network device through an internal high speed signal wire of a crosspoint switch array but does still allow for full monitoring capabilities including the generation of statistical data and error detection, as well as replication capabilities including multicasting, broadcasting and switching capabilities. The low latency signal path provided by the apparatus 1 in the low latency operation mode does not pass through serializer/deserializer entities so that the signal path of the signal processing apparatus 1 in the low latency operation mode is lower by a significant factor than in a conventional apparatus, as illustrated for example in context with FIG. 3. In a possible embodiment, the signal latency provided by the signal processing apparatus 1 according to the first aspect of the present invention is smaller than provided by a conventional apparatus in the low latency operation mode by a factor of 100 to 1,000. In a possible embodiment, the signal processing apparatus 1 according to the present invention can be integrated in a more complex device or apparatus, for instance in an access device of a network for connecting clients to the respective network. Further, the signal processing apparatus 1 can be integrated in a demarcation apparatus of a network separating different network domains.

The invention claimed is:

1. A signal processing apparatus comprising bidirectional high speed ports connected via an integrated high speed serial switch fabric and serializer/de-serializer circuits to an internal processing logic,
    wherein said high speed serial switch fabric is adapted to switch a serial reception signal received by a high speed port to at least one other high speed port of said apparatus in addition to connections with a parallel domain of said high speed ports, and
    wherein each bidirectional high speed port comprises at least one internal loopback signal path provided to loop a signal received by its reception port directly back to its transmission port in response to an internal control signal repurposed for use as a low latency functional path, wherein the reception port of each bidirectional high speed port comprises a clock and data recovery circuit receiving the serial reception signal and supplying the respective serializer/de-serializer circuit of said bidirectional high speed port with a recovered clock signal and with a recovered serial reception signal, wherein each bidirectional high speed port comprises a pre-CDR loopback signal path and a post-CDR loopback signal path either of which can be repurposed as a low latency functional path.

2. The signal processing apparatus according to claim 1, wherein the integrated high speed serial switch fabric provides a direct low signal latency port-to-port with a latency less than 10 nanoseconds or less than several UI.

3. The signal processing apparatus according to claim 1, wherein the serializer/de-serializer circuit of the receiving high speed port is adapted to de-serialize the serial reception signal to generate an internal parallel signal applied to the internal processing logic of said apparatus.

4. The signal processing apparatus according to claim 1, wherein the high speed serial switch fabric is adapted to switch the serial reception signal in response to an external control signal received by a control signal interface of said apparatus or in response to an internal control signal generated by said internal processing logic.

5. The signal processing apparatus according to claim 1, wherein the signal processing apparatus is realized in an FPGA, ASIC, ASSP, SoC or hybrid crosspoint.

6. The signal processing apparatus according to claim 1, wherein the integrated high speed serial switch fabric is used to at least one of tap, replicate and switch the serial reception signal received by the high speed port of the apparatus for use as a low latency functional path.

7. The signal processing apparatus according to claim 1, wherein the internal processing logic is adapted to process the internal parallel signals provided by the serializer/de-serializer circuit for at least one of signal monitoring, signal evaluation, further processing and manipulation of the de-serialized reception signal.

8. The signal processing apparatus according to claim 1, wherein if an error is detected by the internal processing logic during signal processing of the de-serialized reception signal, an internal error detection signal is generated.

9. The signal processing apparatus according to claim 1, wherein external units connected to the high speed ports of said apparatus comprise at least one of network devices and client devices.

10. The signal processing apparatus according to claim 1, wherein the reception port of each bidirectional high speed port is connected to a signal converter adapted to convert a received optical signal into an electrical signal and wherein the transmission port of each bidirectional high speed port is connected to a signal converter adapted to convert an electrical signal into an optical signal.

11. The signal processing apparatus according to claim 1, wherein the high speed serial switch fabric comprises one or more multiplexing units per high speed port to select an internal logic signal provided by the internal processing logic or a reception signal received by another high speed port to be transmitted by the transmission port of the respective high speed port.

12. The signal processing apparatus according to claim 1, wherein the at least one internal loopback signal path within the bidirectional high speed port is connected to the multiplexing unit of said high speed serial switch fabric.

13. The signal processing apparatus according to claim 10, wherein the multiplexing unit of the bidirectional high speed port is controlled by selection bits stored in a control register of said programmable high speed serial switch fabric.

14. The signal processing apparatus according to claim 10, wherein in response to the internal error detection signal generated by the internal processing logic, an error detection signal pattern is inserted by means of the multiplexing unit of the respective bidirectional high speed port and transmitted.

15. A signal processing apparatus having at least two bidirectional high speed ports, each being provided for connecting an external unit to said apparatus,
    wherein in a low latency operation mode of said apparatus' reception ports of a pair of high speed ports connecting said apparatus with a first external unit and with a second external unit are switched to provide a direct internal low latency communication link between both external units via loopback signal paths of said pair of high speed ports, and
    wherein each bidirectional high speed port comprises at least one internal loopback signal path provided to loop a signal received by its reception port directly back to its transmission port in response to an internal control signal repurposed for use as a low latency functional path, wherein the reception port of each bidirectional high speed port comprises a clock and data recovery circuit receiving the serial reception signal and supplying the respective serializer/de-serializer circuit of said bidirectional high speed port with a recovered clock signal and with a recovered serial reception signal, wherein each bidirectional high speed port comprises a pre-CDR loopback signal path and a post-CDR loopback signal path either of which can be repurposed as a low latency functional path.

16. A signal processing apparatus for point to point or point to multipoint communication between external units with low latency, said apparatus having bidirectional high speed ports, each being provided for connecting an external unit to said apparatus, wherein each bidirectional high speed port of said apparatus comprises a transmission port and a reception port connected to a serializer/de-serializer circuit which in a normal operation mode of said apparatus de-serializes a serial reception signal received by the reception port of said high speed port from the respective external unit to generate an internal parallel signal applied to an internal processing logic of said apparatus and to serialize an internal parallel signal supplied from the internal processing logic of said apparatus to generate a serial signal transmitted from the transmission port of said bidirectional high speed port to the respective external unit;

wherein each bidirectional high speed port of said apparatus further comprises at least one internal loopback signal path adapted to loop in a functional mode of said apparatus a signal received by its reception port directly back via its transmission port;

wherein the reception port of each bidirectional high speed port comprises a clock and data recovery circuit receiving the serial reception signal and supplying the respective serializer/de-serializer circuit of said bidirectional high speed port with a recovered clock signal and with a recovered serial reception signal, wherein each bidirectional high speed port comprises a pre-CDR loopback signal path and a post-CDR loopback signal path either of which can be re-purposed as a low latency functional path; and wherein in a low latency operation mode of said apparatus the reception ports of a pair of high speed ports connecting said apparatus with a first external unit and with a second external unit are switched to provide a direct low latency communication link between both external units via the loopback signal paths of said pair of bidirectional high speed ports.

17. A method for a point to point or point to multipoint communication with low latency, comprising:

receiving serial reception signals at bidirectional high speed ports of a serial processing apparatus according to claim 1; and switching or replicating the serial reception signals by means of an integrated high speed serial switch fabric to provide a direct internal low latency communication link between external units connected to said high speed ports of said serial processing apparatus.

\* \* \* \* \*